(12) United States Patent
Momot

(10) Patent No.: US 9,977,897 B2
(45) Date of Patent: May 22, 2018

(54) SYSTEM AND METHOD FOR DETECTING STACK PIVOT PROGRAMMING EXPLOIT

(71) Applicant: Leviathan, Inc., Seattle, WA (US)

(72) Inventor: Falcon Momot, Seattle, WA (US)

(73) Assignee: Leviathan Security Group, Inc., Seattle, WA (US)

( * ) Notice: Subject to any disclaimer, the term of this patent is extended or adjusted under 35 U.S.C. 154(b) by 0 days. days.

(21) Appl. No.: 14/801,753

(22) Filed: Jul. 16, 2015

(65) Prior Publication Data

US 2016/0196428 A1    Jul. 7, 2016

Related U.S. Application Data

(60) Provisional application No. 62/025,120, filed on Jul. 16, 2014.

(51) Int. Cl.
*G06F 11/00* (2006.01)
*G06F 21/54* (2013.01)
*G06F 21/55* (2013.01)

(52) U.S. Cl.
CPC ............ *G06F 21/54* (2013.01); *G06F 21/554* (2013.01); *G06F 2221/033* (2013.01)

(58) Field of Classification Search
CPC ... G06F 21/54; G06F 21/554; G06F 2221/033
USPC .......................................................... 726/23
See application file for complete search history.

(56) References Cited

U.S. PATENT DOCUMENTS

| | | | | |
|---|---|---|---|---|
| 6,941,473 B2 * | 9/2005 | Etoh | ..................... | G06F 9/4426 712/E9.083 |
| 7,260,843 B2 * | 8/2007 | Hentunen | ........... | H04L 63/1416 726/11 |
| 7,380,245 B1 * | 5/2008 | Lovette | ................. | G06F 11/073 709/200 |
| 7,467,272 B2 * | 12/2008 | Genty | ................. | G06F 12/1466 711/163 |
| 7,546,587 B2 * | 6/2009 | Marr | ....................... | G06F 21/10 717/124 |
| 8,037,526 B1 * | 10/2011 | Satish | ..................... | G06F 21/52 711/6 |
| 8,301,433 B2 * | 10/2012 | Kinno | ....................... | G06F 8/20 703/22 |
| 8,561,198 B2 * | 10/2013 | Singh | ..................... | G06F 21/52 726/25 |

(Continued)

*Primary Examiner* — Samson Lemma
(74) *Attorney, Agent, or Firm* — Vernon W. Francissen

(57) ABSTRACT

Systems, methods and media are shown for detecting a stack pivot programming exploit that involve extracting return addresses from a call stack from a snapshot of a running program and, for each extracted return address, identifying a stack frame and following frame from stack pointer information, checking whether the stack is consistent with the type of stack generated by the operating system and architecture conventions, and alerting that a stack pivot is likely if an anomaly in stack layout is found. Some examples involve determining whether the stack frame and following frame follow consistently in one of ascending or descending addresses. Some examples involve, given a consistent directional polarity and metadata about the directional polarity of the stack specified by one of the microarchitecture, operating system, software, or other configuration, determining whether the observed directional polarity corresponds to the expected directional polarity.

20 Claims, 6 Drawing Sheets

(56) References Cited

U.S. PATENT DOCUMENTS

| | | | | |
|---|---|---|---|---|
| 8,850,408 B2* | 9/2014 | Hinkle | ............... | G06F 11/3636 |
| | | | | 717/127 |
| 9,251,373 B2* | 2/2016 | AlHarbi | ................. | G06F 21/64 |
| 2004/0133777 A1* | 7/2004 | Kiriansky | ............... | G06F 21/53 |
| | | | | 713/166 |
| 2004/0168078 A1* | 8/2004 | Brodley | ................. | G06F 21/52 |
| | | | | 713/190 |
| 2006/0161739 A1* | 7/2006 | Genty | ................ | G06F 12/1466 |
| | | | | 711/152 |
| 2007/0180524 A1* | 8/2007 | Choi | ....................... | G06F 21/52 |
| | | | | 726/23 |
| 2013/0013965 A1* | 1/2013 | Guillemin | .............. | G06F 21/52 |
| | | | | 714/48 |
| 2013/0275981 A1* | 10/2013 | Dalcher | ............. | G06F 11/3466 |
| | | | | 718/100 |
| 2014/0283088 A1* | 9/2014 | AlHarbi | ................. | G06F 21/64 |
| | | | | 726/26 |
| 2015/0007266 A1* | 1/2015 | Wang | ...................... | G06F 21/54 |
| | | | | 726/3 |
| 2015/0215335 A1* | 7/2015 | Giuliani | ............. | H04L 63/1441 |
| | | | | 726/23 |
| 2016/0021134 A1* | 1/2016 | Li | ...................... | H04L 63/1441 |
| | | | | 726/23 |
| 2016/0092673 A1* | 3/2016 | LeMay | .................. | G06F 21/56 |
| | | | | 718/1 |
| 2016/0094552 A1* | 3/2016 | Durham | ................. | G06F 21/00 |
| | | | | 713/171 |

* cited by examiner

US 9,977,897 B2

SYSTEM AND METHOD FOR DETECTING STACK PIVOT PROGRAMMING EXPLOIT

CROSS REFERENCE TO RELATED APPLICATIONS

This application claims the benefit of U.S. Provisional Patent Appl. No. 62/025,120 for "System and Method for Detecting Return Oriented Programming Exploit" filed Jul. 16, 2014, herein incorporated by reference in its entirety for all purposes.

GOVERNMENT LICENSE RIGHTS

This invention was made with government support under FA8750-12-C-0161 awarded by the United States Air Force. The government has certain rights in the invention.

BACKGROUND

Computer networks and the devices and services that reside on them are often the subject of attacks by parties that are attempting to improperly access information and resources or to introduce malicious code to the networks. One type of attack is based on return oriented programming (ROP), wherein attackers link together short runs of code already present in a program's address space in order to gain control of programs without relying on code injection.

SUMMARY

According to one aspect of the present invention, an example of a method for detecting a return oriented exploit calls for searching a code stack from a snapshot of a running program, extracting return addresses from the call stack, for each extracted return address, identifying a stack frame and following frame from stack pointer information, checking whether the return address was put on the call stack by a call instruction, and alerting that a stack pivot programming exploit is likely if no call instruction related to the return address is found.

In a refinement of the method, the step of identifying a stack frame and following frame from stack pointer information further involves identifying the location of the stack frame and the following frame using a stack pointer and frame or base pointer. The method further involves determining whether the stack frame and following frame follow in one of ascending and descending addresses to identify whether the stack frame and following frame are consecutive and have consistent directional polarity; it further involves the step of alerting that a stack pivot programming exploit is likely if the stack frame and following frame are either not consecutive or do not have consistent directional polarity. In a further refinement, the step of determining whether the stack frame and following frame follow in one of ascending and descending addresses to identify whether the stack frame and following frame are consecutive and have consistent directional polarity further involves, given a consistent directional polarity and metadata about the directional polarity of the stack specified by one of the microarchitecture, operating system, software, or other configuration, determining whether the observed directional polarity corresponds to the expected directional polarity to detect whether a legitimate call stack has been replaced by a malformed return-oriented programming exploit call stack as part of an attempted attack.

In yet another refinement, the method calls for analyzing code immediately preceding a location referenced by the return address to determine if the code corresponds to a call instruction or does not lie at an aligned instruction within the program's blockgraph as externally determined, finding that a return oriented programming exploit is likely if no call instruction related to the return address is found or the return address does not point to an aligned instruction within the blockgraph, and the step of alerting that a stack pivot programming exploit is likely further involves combining the determination that a stack pivot programming exploit is likely with the finding that a return-oriented programming exploit is likely in order to determine whether a stack pivot programming exploit is likely.

In still another refinement, the method involves analyzing code immediately preceding a location referenced by the return address to determine if the code corresponds to a call instruction includes, given a consistent directional polarity and metadata about the directional polarity of the stack specified by one of the microarchitecture, operating system, software, or other configuration, whether the observed directional polarity corresponds to the expected directional polarity. In yet another refinement of the method, the method includes using metadata regarding the acceptable location of stack frames according to the configuration or state of the system, its microarchitecture, or its operating system to determine whether the results of analysis are valid. In another refinement of the method, the method involves combining the finding of discontiguity with the finding of return-oriented programming to determine whether a stack pivot was used in an attempt to exploit a vulnerability in the program. In yet another refinement of the method, the method includes raising an alert when a finding of discontiguity, return-oriented programming, stack pivoting, or any combination thereof is raised, where that alert includes the specific facts and findings which caused it to be raised.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
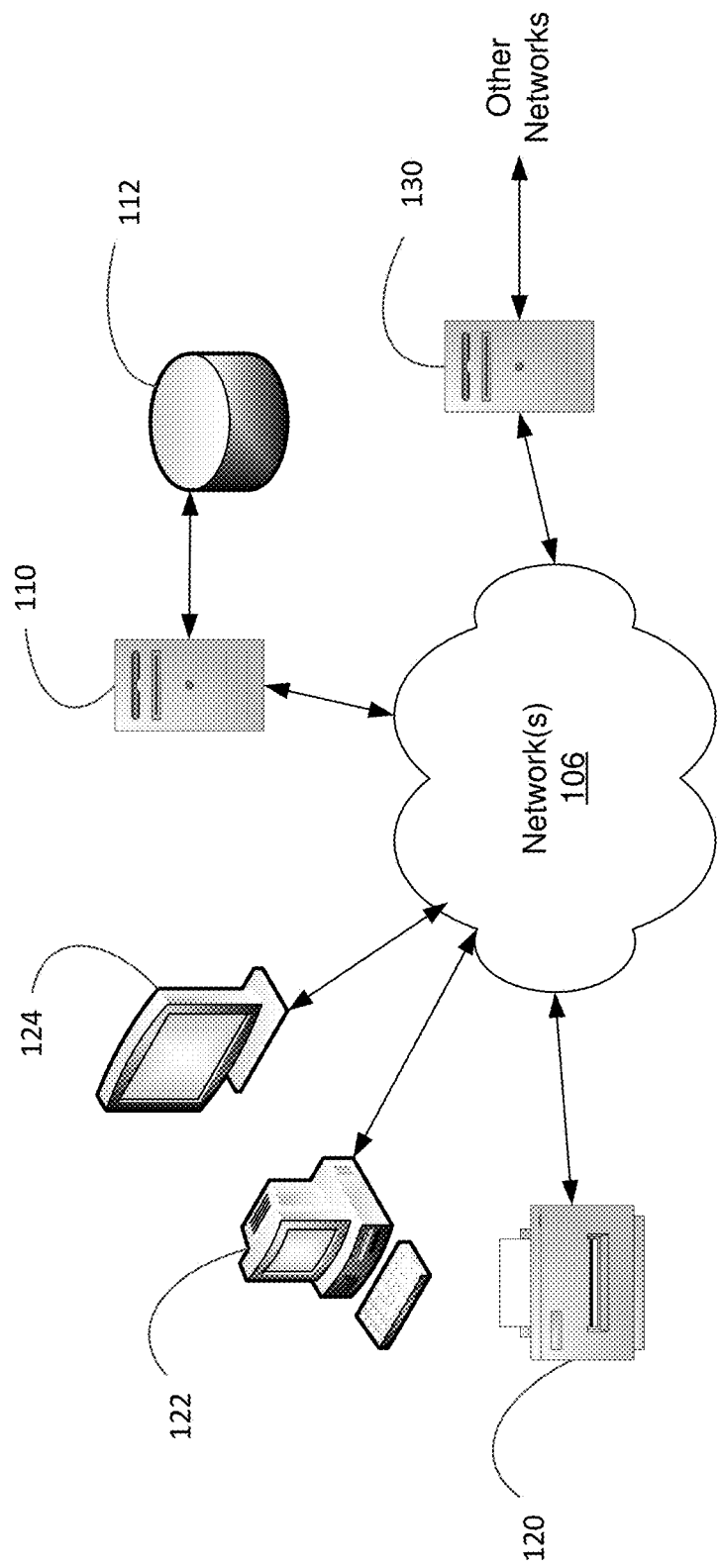
FIG. 1 is a schematic diagram depicting an example of a computer network based system that may be subject to attack and may be suitable for utilization of certain aspects of the present invention.

FIG. 1 is an architecture diagram that depicts aspects of an example of a computer network system with communication among multiple devices. In this example, network 106, which can be one network or multiple networks, provides communication between server 110 connected to database 112 and several client devices, such as printer 120, personal computer 122, and interactive terminal 124. The architecture of FIG. 1 is a simplified representation of an enterprise environment having a multitude of different computing devices that may represent a target for an attack. A gateway 130 provides a communications link between the network 106 and other networks, such as the internet, through which an attacker may launch an attack.

Return-oriented programming (ROP) is a computer security exploit technique in which the attacker uses control of the call stack to indirectly execute cherry-picked machine instructions or groups of machine instructions immediately prior to the return instruction in subroutines within the existing program code, in a way similar to the execution of a threaded code interpreter, or computationally equivalent sequences formed from existing memory contents in general. Because all the instructions that are executed are from executable memory areas within the original program, this avoids the need for direct code injection, and circumvents most measures that try to prevent the execution of instructions from user-controlled memory. ROP can be done on anything that the processor can execute, including data that happens to be executable.

In most micro-architectures, there does not exist a 1:1 correspondence between programmer intentions and machine instructions. In particular, a single intention (such as to branch control to a particular procedure if a condition is met) generally requires more than one instruction. Moreover, instructions are variable-length in many architectures, and thus an instruction may start at any byte; the meaning of an instruction stream thus differs according to the starting alignment, the exploitation of which is commonly termed instruction splitting. This may also be used by an attacker to derive instructions from the instruction stream which were not initially present, without modifying the instruction stream itself. However, the microarchitecture does not enforce this higher level of atomicity, and it is possible for each instruction to be evaluated individually. Many techniques exist for attackers to create "weird machines," or novel paths of execution composed entirely of instructions intentionally extant in the original program text. Fragments of machine code that comprise these weird machines are often termed widgets or gadgets. In the typical case, a widget is a series of instructions terminating in a branch instruction (e.g. jump, call, return, branch, etc.).

In ROP, in particular, the widgets end in a return instruction that derives the return address from the stack, which the attacker uses by manipulating the call stack to take advantage of a programming error, such as a buffer overrun, in a function with an exploitable buffer overrun vulnerability where the vulnerable function overflows the space allocated to its local variables and overwrites the return address. The return address is normally used by the vulnerable function to redirect control flow back to the calling function. If the return address has been overwritten, then control flow will be diverted to the location specified by the new return address. In one example, a standard buffer overrun attack, the attacker places the attack payload onto the stack and then overwrites the return address of the exploitable function with the stack location of the attack payload. During program execution, the exploited function returns control to the attack payload instead of the calling function.

In the case of return-oriented programming, to support the return, successive stack frames are constructed and placed on the stack or the stack pointer is moved to another address (replacing the actual stack with one created by an attacker in attacker-controlled memory), following which a return is made. The attacker controls an arbitrarily long set of return addresses, which collectively form a successive chain of widgets chosen by the attacker. Because the return address is normally consequent to the execution of a call instruction that intrinsically places the address of the following instruction on the stack for later return, it is possible given a stack to validate whether it is the result of intended execution or an implementation of the aforementioned return-oriented programming weird machine. Mechanisms for determining the constituents of each frame, and in particular the frame boundaries and return address, are already extant and widely available, and support this process.

Figure 2A:
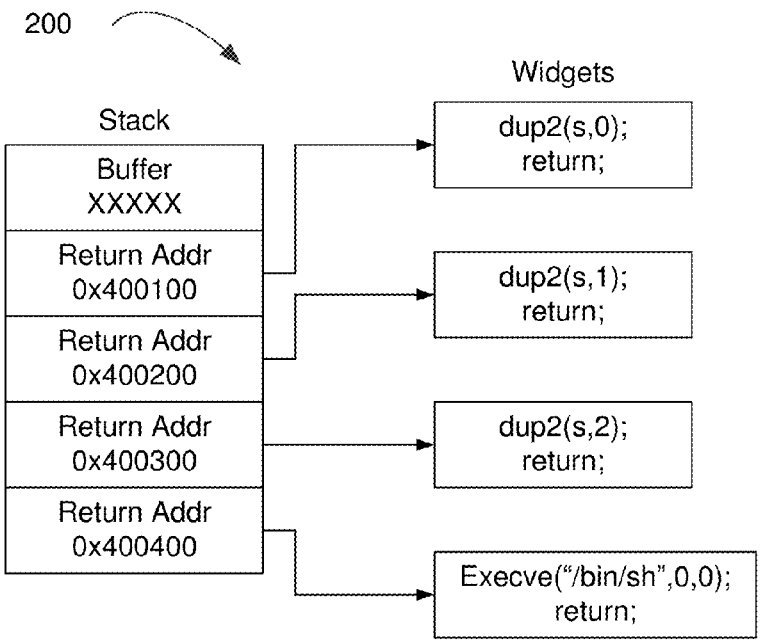
FIGS. 2A and 2b are schematic diagrams illustrating examples of return oriented program exploits.
Figure 2B:
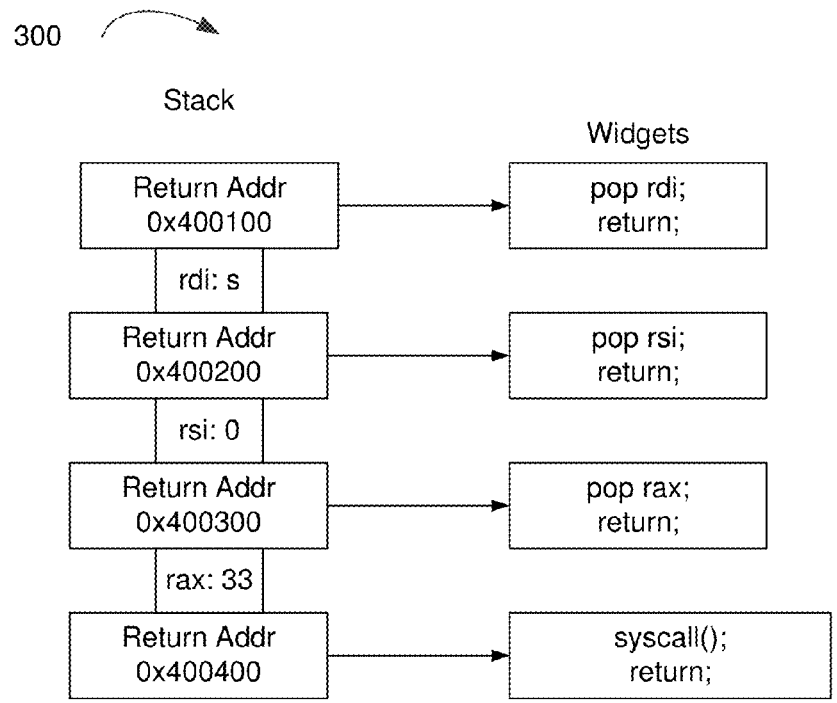

FIGS. 2A and 2B are schematic diagrams illustrating an example of a ROP exploit, where "s" is, in this example, a file number of a socket for a reverse shell. The goal of ROP is to build an instruction sequence that typically spawns a shell (shellcode) based on existing code fragments (widgets). Once a shell is executed, the attacker can execute more commands to continue the attack. Historically, exploits would inject off-the-shelf shellcode into the process and execute it.

An example of typical shellcode that pipes the attacker's socket to standard input, output and error and executes a shell is as follows: dup2(s, 0); dup2(s, 1); dup2(s, 2); execve("/bin/sh", 0, 0), which is Linux shellcode with the Linux x86 ABI. FIG. 2A shows how ROP can in principle be used to execute this shellcode. The stack is overflowed so that the addresses of all the gadgets are present in sequence. Each widget ends with a return so that the next widget can execute. Each ROP widget will be a short sequence of machine instructions terminated by a return. Executing a simple system call like dup2 will require multiple widgets because arguments are passed in registers, so widgets to populate these will be needed.

FIG. 2B shows the required widgets for dup2. Registers rdi and rsi control the first two arguments to system calls and rax controls the system call number. Registers can be controlled by using pop widgets and placing the value to load onto the stack. By chaining a series of widgets, a complete shellcode program can be built.

It should be noted that a stack typically contains only return addresses which point to aligned locations immediately preceded by an aligned call instruction (the latter implies the former, but the former does not imply the latter). This condition, coupled with clean termination of the stack (i.e. a final null base pointer address in Linux), is a negative indication of ROP. ROP is indicated if a return address is found which points to some place where no call instruction is in evidence. Also, detecting an attack in accordance with certain aspects of the present invention often depends upon both data and instructions being stored in random access memory, and upon a call stack which refers to instruction locations in random access memory. This often isn't the case with either a pure stack machine or a pure register machine. In other words, certain embodiments of the invention are best applicable on a RASP which implements a call stack in software.

Figure 3:
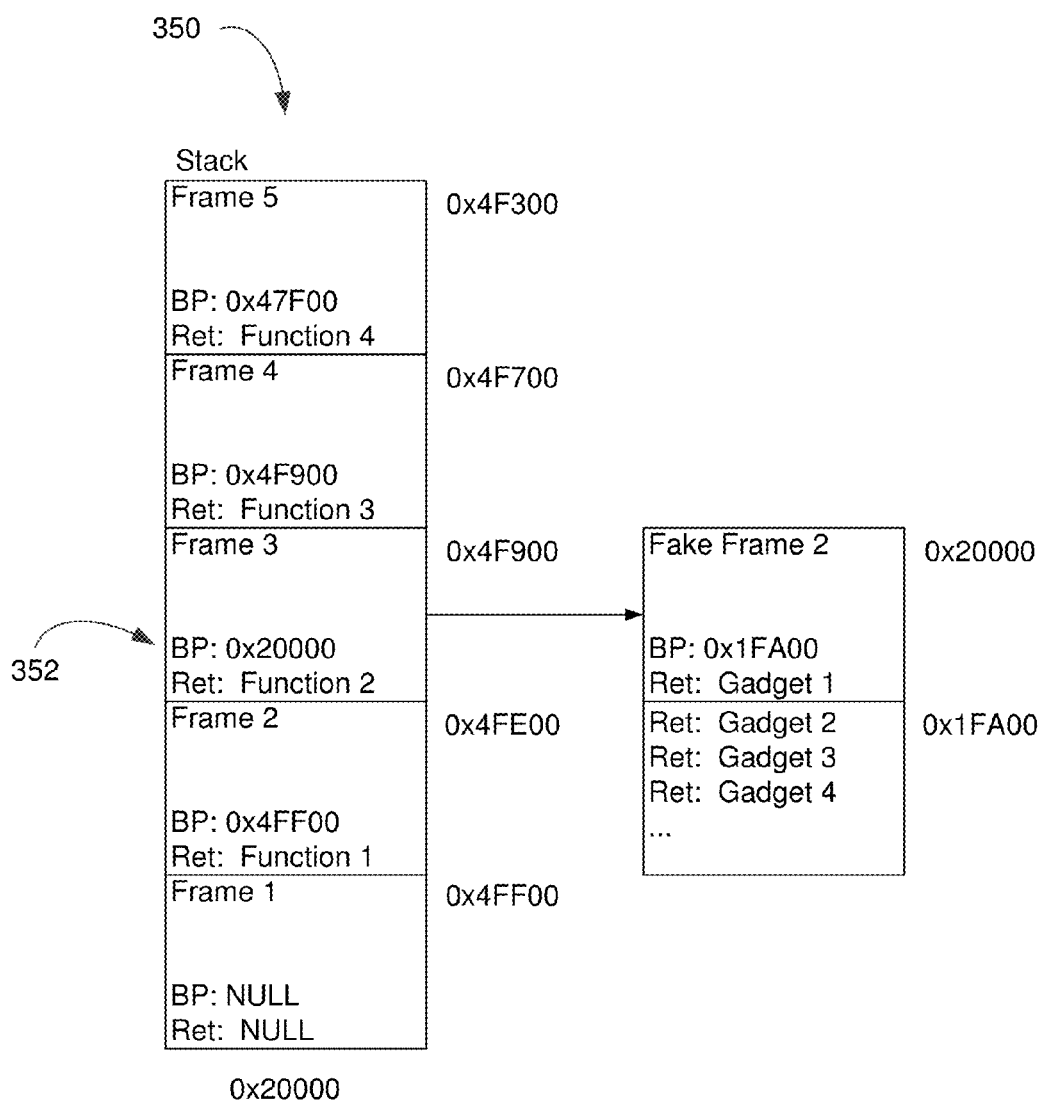
FIG. 3 is a schematic diagram illustrating an example of a stack pivot program exploit.

FIG. 3 is a schematic diagram illustrating an example 350 of a stack pivot program exploit. In this example, the attacker was able to overwrite a base pointer 352 in Frame 3 with address 0x20000. The base pointer overwrite causes the epilogue of the comprised Function 3 to pivot the stack. As a result, Function 2 returns into the attacker's ROP chain in Fake Frame 2 at address 0x20000. Note, however, that the address 0x20000 is not contiguous with the adjoining frame addresses 0x4FE00, and 0x47000 in the stack and the polarity of the stack is violated.

Generally speaking, certain embodiments of the present invention involve, first, finding the series of stack frames and their return addresses, and, second, analyzing whether the return addresses were put on the stack by a call instruction (since the set of addresses which a call instruction can place are typically limited by the location of call instructions, assuming non-self-modifying code). Checking directional polarity and contiguity and bounds may be included in the function of finding the series of stack frames and their return addresses and may serve two purposes: to alert that the results of the second step of analyzing whether the return addresses may not be reliable, and to alert that the call stack is not one that could have been produced by the intended action of the program (and thus a bug is present, but whether the artifact represents an attempt to exploit it may not be determinable in this embodiment). The positive determination of a ROP exploit is made at the second step of analyzing whether the return addresses were put on the stack by a call instruction. There is also a special case: that of a stack pivot, which is what the discontiguity condition detects. If discontiguity is detected in the first step, and the second step identifies returns to gadgets, then the determination that the stack includes a ROP/pivot may be drawn with significant degree of confidence even though the stack may send execution in an indeterminate direction after the payload is called.

The present approach does not focus on pathfinding between two program states, nor does it validate the observed behavior of the program against a fingerprint, signature, or theoretical machine. Instead, embodiments of the present invention examine the sequence of return addresses on the stack for apparent consistency. If the stack is irregular in that it is discontiguous or violates directional polarity, then the immediately preceding base pointer and instruction pointer and all subsequent base pointers and instruction pointers may be attacker-controlled. It is then likely that they were placed there by an attacker writing a ROP chain or something similar onto the stack, or conducting a stack pivot for some other reason.

The inference holds unless the attacker overwrites the entire stack with contents which appear legitimate and does not use a stack pivot, which is difficult constraint to satisfy in the face of countermeasures such as ASLR and limited buffer lengths; these constraints are more likely to be present in a program which must be exploited by ROP.

Additionally, if the return address or base pointer points to uncommitted memory, it is highly probable that a call instruction and function prologue did not write them. In general terms, the approach is to determine whether no legitimate sequence of execution could have generated the observed stack. Since determining precisely whether code is intentionally executable is not computable, it cannot be determined absolutely whether a pointer lies within intentionally executable code. But in the case where clear anomalies in stack layout are present, however this is verified, an anomaly exists.

An additional validated constraint that may be combined in some examples is that the CALL instruction that is found is one that is part of the normal program text. That is to say, the CALL instruction is not simply a misaligned instruction (and thus not really a call) or a piece of non-code data, or in an arbitrary non-code chunk of memory. This constraint is validated weakly, in that the lack of a known alignment will be interpreted differently from a known misalignment, and only a weak effort is made to ensure that it is within intentionally executable code.

Figure 4:
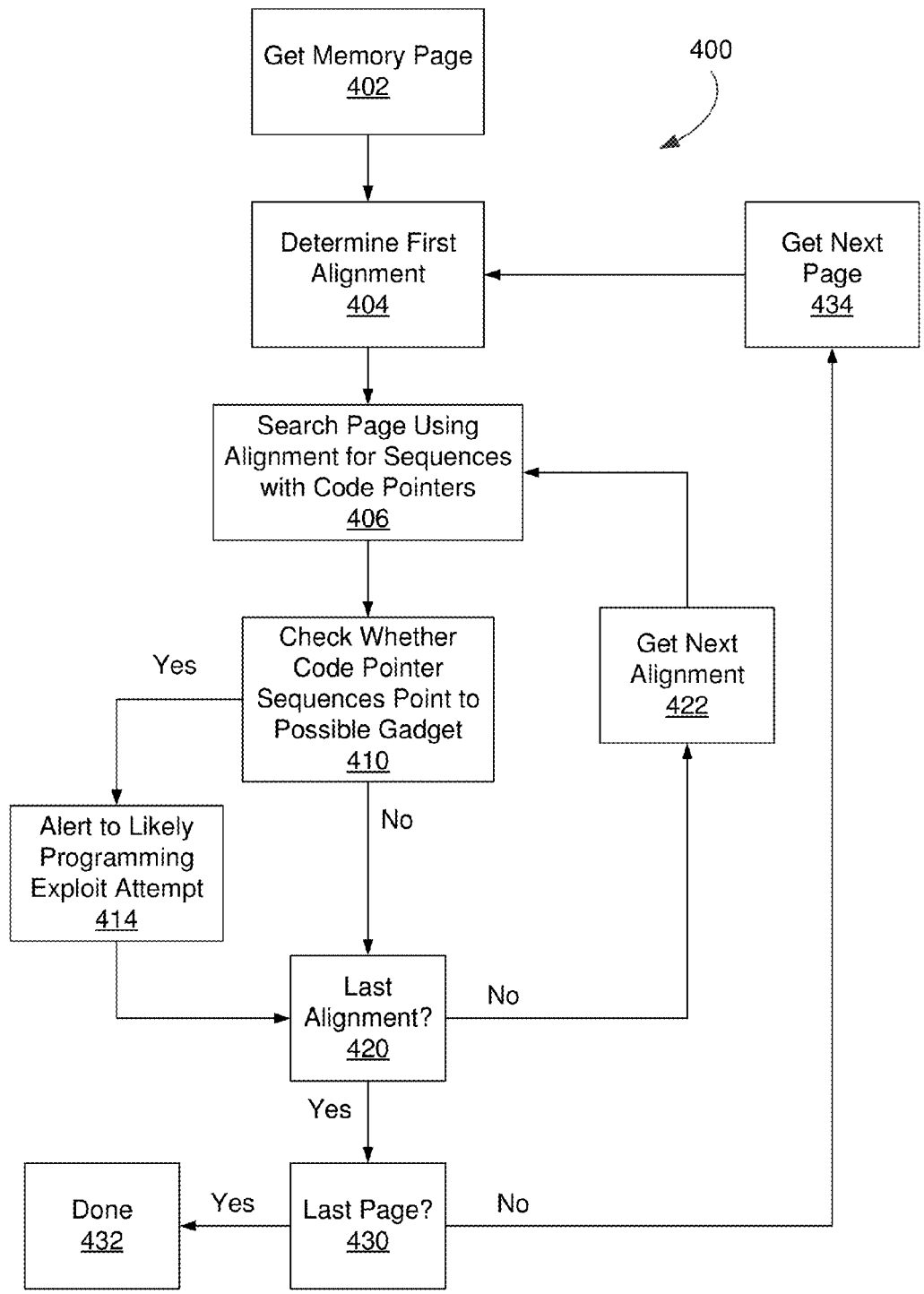
FIG. 4 is a control flow diagram illustrating an example of a process for inspecting a stack for ROP exploit code in accordance with some aspects of the present invention.

FIG. 4 is a control flow diagram illustrating an embodiment of a process for inspecting a stack for ROP exploit code. The process uses the return address to validate that the stack contains only frames that could feasibly have been generated by successive normal function calls. That is to say, that the return address in the frames could have been placed on the stack by the action of the CALL instruction in code that did not change since the frame was pushed. At step 402, the process is initiated for a received stack and, at step 404, the stack is searched for return addresses in the code on the stack. In some embodiments, step 404 may involve breaking the stack into frames and extracting a series of return addresses, optionally validating various characteristics of the stack. Also, it is not necessary for the return addresses to be in code for the purposes of step 404. Further, step 406 may be performed using a block graph that contains information about the return addresses.

If a related call instruction is found, then the code execution is deemed to be valid at step 410. If no corresponding call instruction is found, then an alert is activated at step 414 indicating that a ROP exploit attempt is likely to have occurred.

Figure 5:
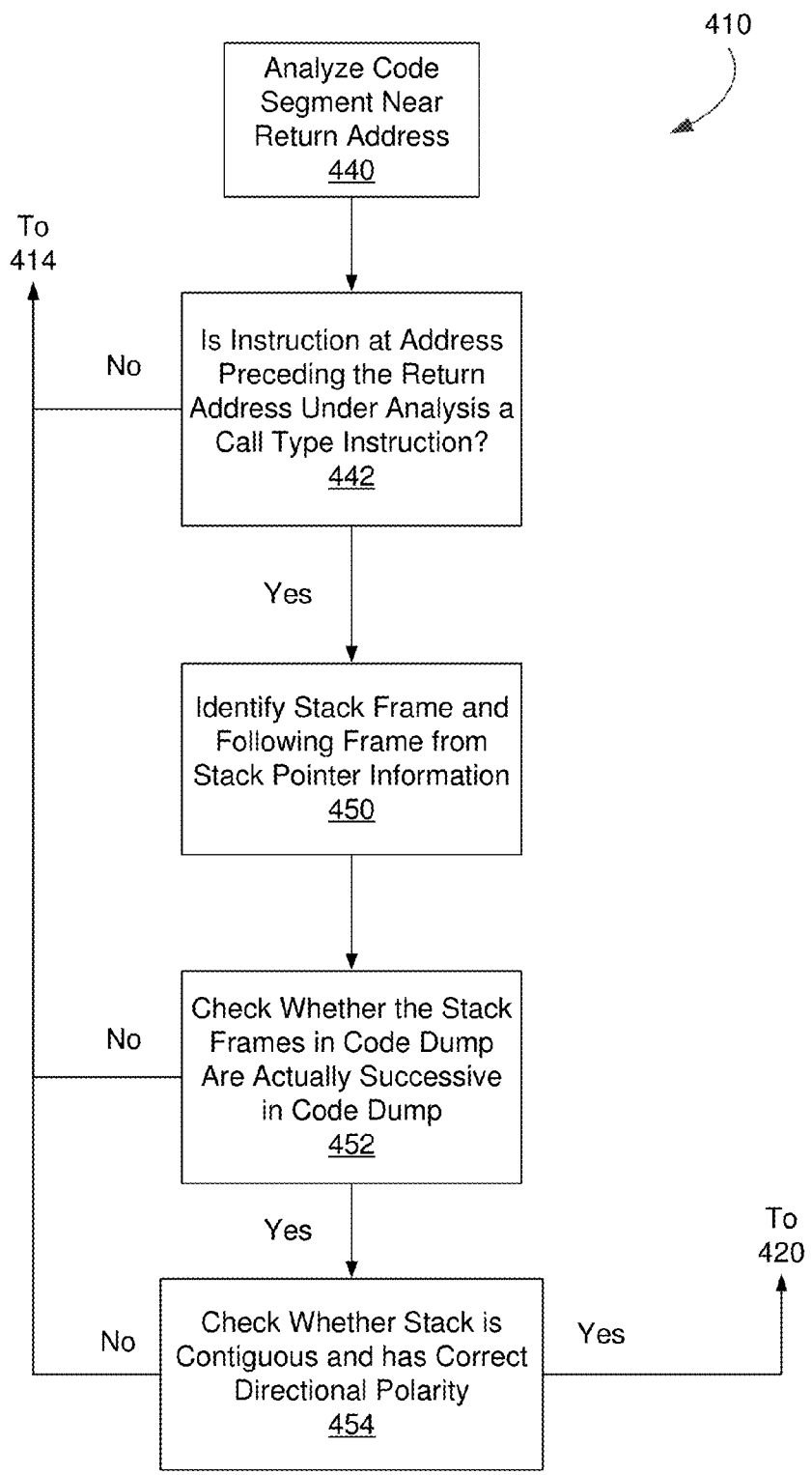
FIG. 5 is a control flow diagram illustrating examples of checking whether code pointer sequences point to possible exploits in accordance with FIG. 4.

In the embodiment of step 410 shown in FIG. 5, code in the vicinity of the return address found on the stack is analyzed, step 440, to determine whether that code includes a call instruction, step 442, that could have caused a branch to the code that includes the return action. In other words, given a return address, the process determines whether or not the previous instruction to the one referenced by the return address was in fact a call instruction that could feasibly have placed it there. This determination is made without regard to instruction alignment in the case that the microarchitecture has variable-width instructions. If the preceding instruction is not a call type instruction, control branches to step 414 to generate an alert indicating a possible programming exploit attempt. If the preceding instruction is a call type instruction, then control branches to step 420.

In one embodiment, step 440 of FIG. 5 may include generating a block diagram of program control flow by a disassembler (recursive-descent or otherwise) and the block diagram utilized at step 442 in determining instruction alignment in order to validate that the call instruction found was in fact not an artifact of instruction alignment, but would have been executed as a call instruction. This block graph is built for the purposes of finding alignment for such CALL instructions.

Note that the analysis at step 410 can also be implemented on a weighted or heuristic basis that considers the individual determinations as a component of an overall decision as to whether the code represents an exploit attempt. For example, if the disassembly and call graph support the alignment, then a negative assertion (i.e. that there is no anomaly) is stronger. A weak assertion that there isn't an anomaly is equivalent to a weak assertion that there is an anomaly. So, if the call graph and disassembly do not support the alignment of the discovered call (whether or not because of a lack of data), it is determined that there is an anomaly that was caused by one of several conditions: an incomplete disassembly due to a shortcoming in the disassembler (since it is necessarily a weak disassembler), corruption of program state unrelated to exploitation (the stack is off in the woods for other reasons), or corruption of program state by returning to inaccessible code or executable non-code. For example, structured exception handling (SEH) or debugging information may provide the length of tags for tag-value framing for the stack. These considerations may contribute to an ultimate determination of whether an alert is generated.

In another embodiment, step 410 may include, at step 450 of FIG. 5, given the stack pointer and base pointer or other information identifying the location of a given stack frame and the following frame (as generated by the immediately prior call, hypothetically) and, at step 452, determining whether each frame in the stack is in fact consecutive, based upon the fact that each successive frame must follow in the direction (ascending or descending addresses) specified by the system microarchitecture or other system components. Note that it is possible either to validate that there is a consistent directional polarity, or that it is in the correct direction. Also in some cases (e.g. 64-bit windows) it is not possible to validate the directional polarity since the polarity and contiguity must be assumed to frame the stack at all, in which case, validation is typically not possible. This is the case where framing information is length-only (in 64-bit windows it is derived from exception handling metadata and gives only the length of each frame). It is typically not possible to generate a negative length usefully, since the ability to do so also implies the ability to do much easier things (in the case of 64-bit windows).

In yet another embodiment, step 410 may include step 454 of FIG. 4, which involves determining, from the contiguity or non-contiguity and directional polarity of the stack as compared with the expected directional polarity, whether the stack has been replaced (or an "alternate" call stack created), or not. Another embodiment may include determining, given the predicates of the determination as to whether the address to return to is an aligned address immediately preceded by a call instruction (including, but not limited to, the availability and indicated reliability of a disassembly used to indicate instruction alignment), the reliability of the assertion made with respect to the same.

In accordance with at least one embodiment of the invention, the system, apparatus, methods, processes and/or operations described herein may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system. In accordance with another embodiment of the invention, the system, apparatus, methods, processes and/or operations described herein may be wholly or partially implemented in the form of a set of processor executable instructions stored on persistent storage media.

As noted above, one alternative embodiment involves using a block graph at step 410 to improve the reliability and ascertain the confidence of the determination made. In this alternative, a determination is made as to whether disassembly information relating to the instructions prior to the return address is available, for example, whether some basic block present in the disassembly contains an instruction start at the return address, and at least one prior instruction. If not, then the code preceding the return address is searched for a related call instruction without regard to alignment. If a related call instruction is not found, then an alert is produced indicating a probable ROP exploit. If a related call instruction is found, then indicate that the return address is likely valid and the presence of an exploit is unlikely, though the confidence level may be lower owing to a lack of alignment metadata. Some embodiments may raise an additional alert in two related conditions: if the return address is within some basic block but not aligned to the start of an instruction, that the return address splits instructions and is thus likely part of an attempt to exploit a vulnerability in the program; and if the return address is not within any basic block, that there was either a disassembly failure or an exploit attempt. If the disassembly information relating to the instructions prior to the return address is available, then check the immediately preceding instruction from the disassembly to determine whether it is a call instruction. If it is not a call instruction, then produce an alert indicating a probable ROP exploit. If it is a call instruction, then indicate that the return address is likely valid and the presence of an exploit is unlikely.

Figure 6:
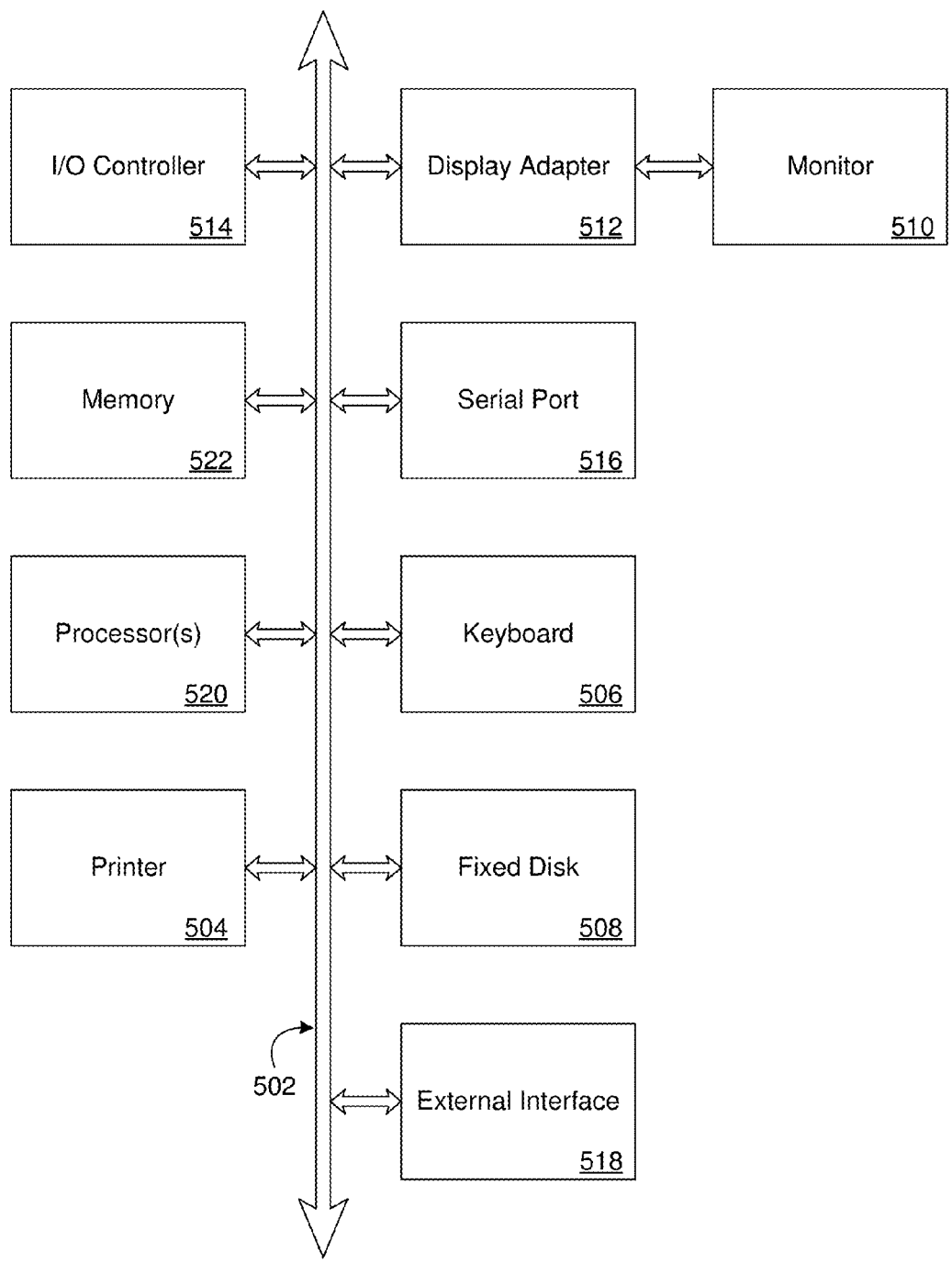
FIG. 6 depicts aspects of elements that may be present in a computer device and/or system configured to implement a method, system and/or process in accordance with some embodiments of the present invention.

FIG. 6 depicts aspects of elements that may be present in one example of a computer device and/or system 500 configured to implement at least some elements of a method, system and/or process in accordance with some embodiments of the present invention. The subsystems shown in FIG. 6 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 4 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components or steps depicted in the drawings or described above, as well as components and steps not shown or described, are possible without departing from the scope of the invention. Similarly, some features and subcombinations are useful and may be employed without reference to other features and subcombinations. Embodiments of the invention have been described for illustrative and not restrictive purposes, and alternative embodiments will be apparent to one of ordinary skill in the art. Accordingly, the present invention is not limited to the embodiments described above or depicted in the drawings, and various embodiments and modifications can be made without departing from the scope of the invention.

I claim:

1. A computer-implemented method for detecting, by a computer processor, a stack pivot programming exploit, the computer-implemented method comprising computer-implemented operations for:
    extracting return addresses from a call stack from a snapshot of a running program; and
    for at least one extracted return address:
        identifying a stack frame and following frame from stack pointer information by either:
            identifying the location of the stack frame and the following frame using a stack pointer and base pointer, or
            generating a block graph of program control flow using a disassembler to determine instruction alignment in order to validate that the call instruction found was in fact not an artifact of instruction alignment but would have been executed as a call instruction when following a program to which the call stack corresponds from one of the program's intended entry points,
        checking whether the return address was put on the call stack by a call instruction, and
        generating an alert, by the computer processor, indicating that a stack pivot programming exploit is likely if no call instruction related to the return address is found.

2. The method of claim 1, wherein:
    the operation of identifying a stack frame and following frame from stack pointer information is performed by identifying the location of the stack frame and the following frame using a stack pointer and base pointer; and
    the method includes determining whether the stack frame and following frame follow in one of ascending and descending addresses to identify whether the stack frame and following frame are consecutive and have consistent directional polarity; and
    the operation of generating an alert, by the processor, indicating that a stack pivot programming exploit is likely further comprises generating an alert, by the processor, indicating that a stack pivot programming exploit is likely if the stack frame and following frame are either not consecutive or do not have consistent directional polarity.

3. The method of claim 2, wherein the operation of determining whether the stack frame and following frame follow in one of ascending and descending addresses to identify whether the stack frame and following frame are consecutive and have consistent directional polarity further comprises, given a consistent directional polarity and metadata about the directional polarity of the stack specified by one of the microarchitecture, operating system, software, or other configuration, determining whether the observed directional polarity corresponds to the expected directional polarity to detect whether a legitimate call stack has been replaced by a programming exploit call stack as part of an attack.

4. The method of claim 1, wherein the method further includes:
    analyzing code immediately preceding a location referenced by the return address to determine if the code corresponds to a call instruction;
    finding that a return oriented programming exploit is likely if no call instruction related to the return address is found; and
    the operation of alerting that a stack pivot programming exploit is likely further comprises combining the determination that a stack pivot programming exploit is likely with the finding that a return-oriented programming exploit is likely in order to determine whether a stack pivot programming exploit is likely.

5. The method of claim 1, wherein the operation of generating an alert, by the processor, indicating that a stack pivot programming exploit is likely includes providing information identifying code relating to the exploit.

6. The method of claim 1, wherein the method further includes determining whether the stack is discontiguous and that it additionally contains return addresses that are not instruction-aligned addresses immediately preceded by a call instruction, and, if so, providing an indication that the exploit represents use of a stack pivot combined with return-oriented programming to execute attack code.

7. A non-transitory storage medium storing computer code having instructions stored therein that configure a processing device to operate to detect a stack pivot programming exploit as follows:

extract return addresses from a call stack from a snapshot of a running program; and
for each extracted return address:
identify a stack frame and following frame from stack pointer information, by either:
identifying the location of the stack frame and the following frame using a stack pointer and base pointer, or
generating a block graph of program control flow using a disassembler to determine instruction alignment in order to validate that the call instruction found was in fact not an artifact of instruction alignment but would have been executed as a call instruction when following a program to which the call stack corresponds from one of the program's intended entry points,
check whether the return address was put on the call stack by a call instruction, and
generate an alert that a stack pivot programming exploit is likely if no call instruction related to the return address is found.

8. The non-transitory storage medium of claim 7, wherein:
the instructions for configuring a processing device to identify a stack frame and following frame from stack pointer information operate by identifying the location of the stack frame and the following frame using a stack pointer and base pointer;
the medium includes instructions for configuring a processing device to determine whether the stack frame and following frame follow in one of ascending and descending addresses to identify whether the stack frame and following frame are consecutive and have consistent directional polarity; and
the instructions for configuring a processing device to generate an alert that a stack pivot programming exploit is likely further comprise instructions configured to generate an alert that a stack pivot programming exploit is likely if the stack frame and following frame are either not consecutive or do not have consistent directional polarity.

9. The non-transitory storage medium of claim 8, wherein the instructions for configuring a processing device to determine whether the stack frame and following frame follow in one of ascending and descending addresses to identify whether the stack frame and following frame are consecutive and have consistent directional polarity further comprise instructions for configuring a processing device to, given a consistent directional polarity and metadata about the directional polarity of the stack specified by one of the microarchitecture, operating system, software, or other configuration, determine whether the observed directional polarity corresponds to the expected directional polarity to detect whether a legitimate call stack has been replaced by a programming exploit call stack as part of an attack.

10. The non-transitory storage medium of claim 7, the medium further including instructions configured to cause the processing device to operate to:
analyze code immediately preceding a location referenced by the return address to determine if the code corresponds to a call instruction;
find that a return oriented programming exploit is likely if no call instruction related to the return address is found; and
the instructions configured to cause the processing device to generate an alert that a stack pivot programming exploit is likely further comprises instructions that cause the processing device to combine the determination that a stack pivot programming exploit is likely with the finding that a return-oriented programming exploit is likely in order to determine whether a stack pivot programming exploit is likely.

11. The non-transitory storage medium of claim 7, wherein the instructions for configuring a processing device to generate an alert that a programming exploit is likely if no call instruction related to the return address is found further include instructions configured to cause the processing device to provide information identifying code relating to the programming exploit.

12. The non-transitory storage medium of claim 7, the medium further including instructions configured to cause the processing device to operate to determine whether the stack is discontiguous and that it additionally contains return addresses that are not instruction-aligned addresses immediately preceded by a call instruction, and, if so, provide an indication that the exploit represents the use of a stack pivot combined with return-oriented programming to execute attack code.

13. The non-transitory storage medium of claim 7, where the instructions configured to cause the processing device to operate to generate an alert that a stack pivot programming exploit is likely includes instructions configured to cause the processing device to operate to provide information identifying code relating to the exploit.

14. An exploit detection system, the system comprising:
at least one processor; and
a memory in communication with the processor, the memory having computer-executable instructions stored thereupon which, when executed by the processor, cause the system to:
extract return addresses from a call stack from a snapshot of a running program; and
for each extracted return address:
identify a stack frame and following frame from stack pointer information, by either:
identifying the location of the stack frame and the following frame using a stack pointer and base pointer, or
generating a block graph of program control flow using a disassembler to determine instruction alignment in order to validate that the call instruction found was in fact not an artifact of instruction alignment but would have been executed as a call instruction when following a program to which the call stack corresponds from one of the program's intended entry points,
check whether the return address was put on the call stack by a call instruction, and
generate an alert indicating that a stack pivot programming exploit is likely if no call instruction related to the return address is found.

15. The system of claim 14, wherein:
the system identifies a stack frame and following frame from stack pointer information by identifying the location of the stack frame and the following frame using a stack pointer and base pointer; and
the memory includes instructions for determining whether the stack frame and following frame follow in one of ascending and descending addresses to identify whether the stack frame and following frame are consecutive and have consistent directional polarity; and
the instructions that cause the processor to generate an alert indicating that a stack pivot programming exploit is likely comprise instructions that cause the processor to generate an alert indicating that a stack pivot programming exploit is likely if the stack frame and following frame are either not consecutive or do not have consistent directional polarity.

16. The system of claim 15, wherein the system determines whether the stack frame and following frame follow in one of ascending and descending addresses to identify whether the stack frame and following frame are consecutive and have consistent directional polarity by, given a consistent directional polarity and metadata about the directional polarity of the stack specified by one of the microarchitecture, operating system, software, or other configuration, determining whether the observed directional polarity corresponds to the expected directional polarity to detect whether a legitimate call stack has been replaced by a programming exploit call stack as part of an attack.

17. The system of claim 14, where the system determines whether the stack is discontiguous and that it additionally contains return addresses that are not instruction-aligned addresses immediately preceded by a call instruction, and, if so, generates an indication that the exploit represents the use of a stack pivot combined with return-oriented programming to execute attack code.

18. The system of claim 14, wherein the memory includes instructions for:

analyzing code immediately preceding a location referenced by the return address to determine if the code corresponds to a call instruction;

finding that a return oriented programming exploit is likely if no call instruction related to the return address is found; and the operation of alerting that a stack pivot programming exploit is likely further comprises combining the determination that a stack pivot programming exploit is likely with the finding that a return-oriented programming exploit is likely in order to determine whether a stack pivot programming exploit is likely.

19. The system of claim 14, wherein the instructions that cause the system to generate an alert indicating that a stack pivot programming exploit is likely includes instructions that provide information identifying code relating to the exploit.

20. The system of claim 14, wherein the memory includes instructions for determining whether the stack is discontiguous and that it additionally contains return addresses that are not instruction-aligned addresses immediately preceded by a call instruction, and, if so, providing an indication that the exploit represents use of a stack pivot combined with return-oriented programming to execute attack code.

\* \* \* \* \*